May 3, 1927.
G. B. SAYRE
1,626,629
WINDSHIELD WIPER
Filed Nov. 9, 1925
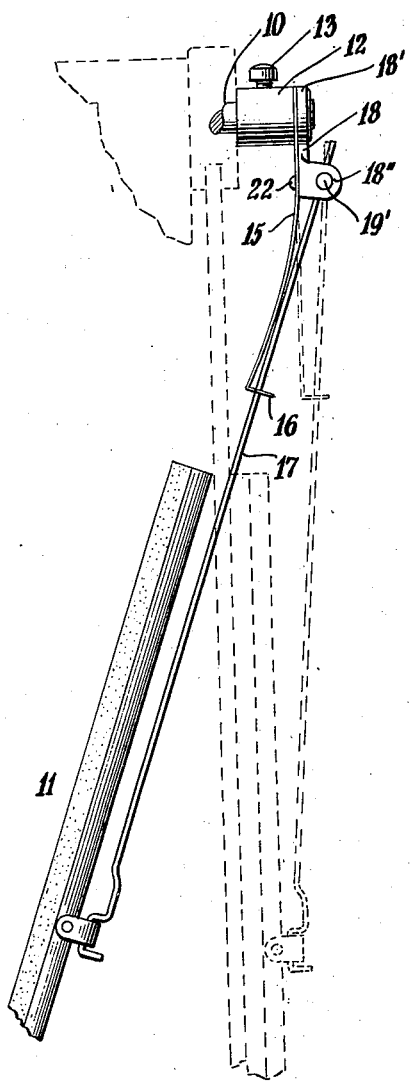
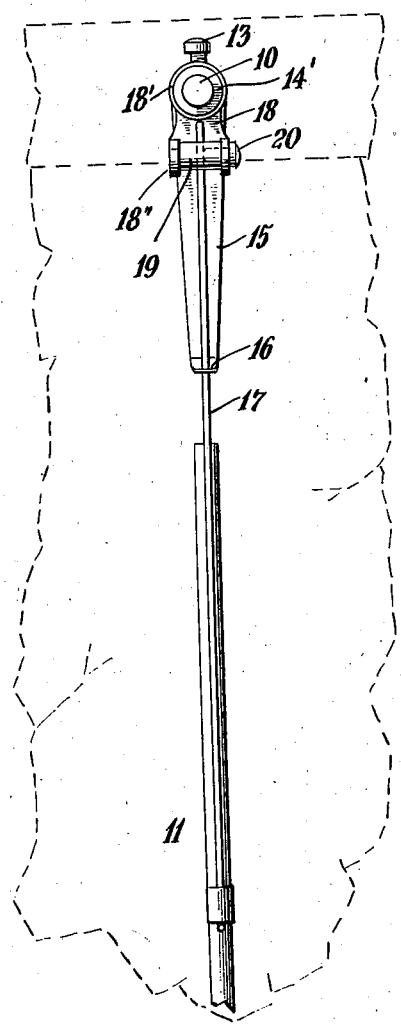
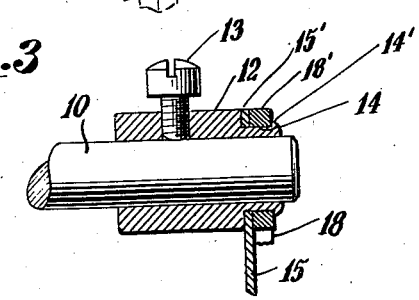
INVENTOR.
Gordon B. Sayre.
BY Ramsay Hoguet,
ATTORNEY Patented May 3, 1927.

1,626,629

UNITED STATES PATENT OFFICE.

GORDON B. SAYRE, OF SYRACUSE, NEW YORK, ASSIGNOR TO OWEN-DYNETO CORPORATION, OF SYRACUSE, NEW YORK, A CORPORATION OF NEW YORK.

WINDSHIELD WIPER.

Application filed November 9, 1925. Serial No. 67,800.

My invention relates to improvements in windshield wipers of the type in which a rotatable driving shaft is made to move the wiping element across the face of the windshield glass to clean it. My invention relates more particularly to the connection between the driving shaft and the wiping element. Usually in structures of this kind, the necessary resilience in the connection between the driving shaft and the windshield wiper lies in the wiper rod connecting the two elements, or if the wiper rod has been reinforced in some way, it has usually been by mechanism likely to get out of order, rather difficult to adjust and assemble, and expensive. The object of my invention is to produce a simple, cheap connection for a driving shaft and wiping element, which can be readily assembled, and in which the wiper rod is rigidly supported in the plane in which it swings while working to clean the glass, but which is pivotally mounted so as to permit the wiper rod and the wiping element to move readily over any obstruction on the glass. My invention further contemplates reinforcing the wiper rod in a manner which will increase its rigidity in the direction of its normal swing, and which will serve to press the wiping element with sufficient firmness against the glass. My invention is also intended to produce a structure of this kind which comprises a simple single unit capable of easy manufacture and of being easily assembled on the driving shaft, and which when once in place needs no further adjustment, but serves nicely to hold the wiping element with sufficient rigidity to insure its effective work, and with sufficient resilience to permit it to ride without damage over any obstructions, for example, frozen material, on the glass.

Reference is to be had to the accompanying drawings forming a part of this specification, in which similar reference characters indicate corresponding parts in all the views.

Figure 1 is a side elevation of my improved device, the windshield being shown diagrammatically in dotted lines.

Figure 2 is a front elevation of the structure shown in Figure 1, and

Figure 3 is an enlarged detail section showing the connection between the wiper rod and driving shaft.

In windshield wipers of this class a rotatable driving shaft 10 is usually arranged adjacent to the windshield, and it carries a wiping element 11 which moves across the glass of the windshield. So far as my invention is concerned, the shaft 10 may be mounted and moved in any convenient way, and the wiping element 11 may be of any preferred kind. On the shaft 10 I place a sleeve 12 which can be held against movement with relation to the shaft by a set screw 13 or equivalent, and the outer end of the sleeve is reduced as shown at 14 to permit the spring member 15 and bracket 18 to be readily secured to the sleeve. The spring member 15 is in the form of a flat spring and widens in the direction of the rotation of the shaft so as to make it rigid in this direction but flattens in a direction parallel with the shaft, so as to impart the necessary tension to the wiping element, as presently described.

The spring member 15 is connected to the wiper rod 17 which carries the wiping element 11, and the connection should be a free connection. To this end the free end of the spring is turned up as shown at 16, and the wiper rod extends through this upturned end portion. The fixed end 15' of the spring member 15 fits on over the reduced end 14 of the sleeve 12. To carry the wiper rod 17 a bracket 18 is used which can be stamped out of sheet metal if desired, and this has one end portion formed into a ring 18' which fits on the reduced end 14 of the sleeve and abuts snugly against the ring portion 15' of the spring member.

When these parts are assembled, the outer end of the part 14 of the sleeve 12 can be upset as shown at 14' in Figure 3, and thus the parts 12, 15' and 18' are all fastened together so that they are, so far as movement is concerned, one piece, and this makes a simple way of making the necessary rigid connection.

The bracket 18 serves as a hanger for the wiper rod 17, and to this end it has upturned ears 18" between which is pivoted a block 19 which is preferably cylindrical, having reduced ends 19' journaled on the ears 18", and a set screw 20 is threaded into one end portion of the block 19 so as to impinge on the wiper rod 17 which extends through the block. It will also be noted that the spring member 15 is rigidly secured to the back of the bracket 18 as shown at 22 so that the members 15 and 18 swing with the shaft as a single unit.

It will be seen that the construction described makes an exceedingly simple but strong and yet resilient connection between the driving shaft and the wiping element which permits the latter to function as specified, and that the parts can be very easily arranged and assembled. It will also be noted that when once the connection is made is there is no need of further adjustment, and there is also practically no danger of the parts being disrupted or disarranged.

I claim:—

1. A windshield wiper comprising a driving shaft, a wiping element, a wiper rod connected with said element, a bracket fast on the shaft and to which said wiper rod is pivotally connected and spring means secured to said shaft and engaging said wiper rod to normally urge the wiping element against said windshield.

2. A windshield wiper comprising a driving shaft, a wiping element, a bracket fast on the shaft, a wiper rod connected to the wiping element and pivoted on the bracket so as to swing generally parallel with the driving shaft, and a flat spring member secured to the shaft and said bracket and connected to the wiper rod to normally urge the wiping element against the windshield.

3. A windshield wiper comprising a driving shaft, a wiping element, a sleeve on the driving shaft having a laterally projecting bracket, a wiper rod connected to the wiping element and pivoted to the bracket so as to swing in a direction parallel with the driving shaft, and a spring member depending from the shaft and secured to the bracket and connected to the wiper rod to normally urge the wiping element against the windshield.

4. A windshield wiper comprising a driving shaft, a wiping element, a sleeve on the driving shaft, a bracket extending laterally from the sleeve and having upturned ears, a wiper rod connected to the wiping element and pivoted between the bracket ears, and a spring member depending from the shaft and secured to the bracket and connected to the wiper rod to normally urge the wiping element against the windshield.

5. A windshield wiper comprising a driving shaft, a wiping element, a sleeve secured to the shaft, a laterally extending bracket on the sleeve, a flat spring member secured between the sleeve and the back of the bracket, and a wiper supporting rod connected to the wiping element and pivoted on on the aforesaid bracket, the free end of said spring being loosely connected with the aforesaid rod for urging the wiper against the glass.

6. In a windshield wiper of the type described, the means for connecting a driving shaft and wiping element comprising a sleeve to fit the shaft, said sleeve having a reduced end, a bracket fitting on the reduced end of the sleeve, a flat spring member also mounted on the reduced end of the sleeve and secured to the bracket, means rigidly securing the spring member and bracket on the sleeve, a wiper rod pivoted on the bracket, and a connection between the aforesaid spring and the wiper rod.

7. A windshield wiper comprising a driving shaft, a wiping element, a sleeve secured to the driving shaft, a bracket depending from said driving shaft and provided with upturned ears at its lower end, a supporting block between said ears, a wiper supporting rod adjustably secured to said supporting block and a spring member secured to said shaft and depending therefrom and connected to said bracket and engaging the wiper supporting rod for normally urging the wiper element against the windshield.

In testimony whereof, I have signed my name to this specification this 6th day of November, 1925.

GORDON B. SAYRE.